2 Sheets--Sheet 1.

J. K. O'NEIL.

Straw-Cutters.

No. 6,232. Reissued Jan. 12, 1875.

WITNESSES,
R. D. O. Smith
E. M. Gallaher

By

INVENTOR,
John K. O'Neil,
J. S. Brown,
his Attorney.

THE GRAPHIC CO. PHOTO-LITH. 39 & 41 PARK PLACE, N.Y.

2 Sheets--Sheet 2.

J. K. O'NEIL.

Straw-Cutters.

No. 6,232. Reissued Jan. 12, 1875.

WITNESSES,
R. D. Smith
E. M. Gallaher.

INVENTOR,
John K. O'Neil,
By Jas. Brown, Jr.
Attorney.

THE GRAPHIC CO. PHOTO-LITH. 39 & 41 PARK PLACE, N.Y.

UNITED STATES PATENT OFFICE.

JOHN K. O'NEIL, OF CANTON, OHIO.

IMPROVEMENT IN STRAW-CUTTERS.

Specification forming part of Letters Patent No. 120,314, dated October 24, 1871; reissue No. 6,232, dated January 12, 1875; application filed October 24, 1874.

*To all whom it may concern:*

Be it known that I, JOHN K. O'NEIL, of Canton, in the county of Stark and State of Ohio, have invented an Improved Straw, Hay, and Stalk Cutter; and I do hereby declare that the following is a full and exact description thereof, reference being had to the accompanying drawings, making part of this specification—

Figure 1:
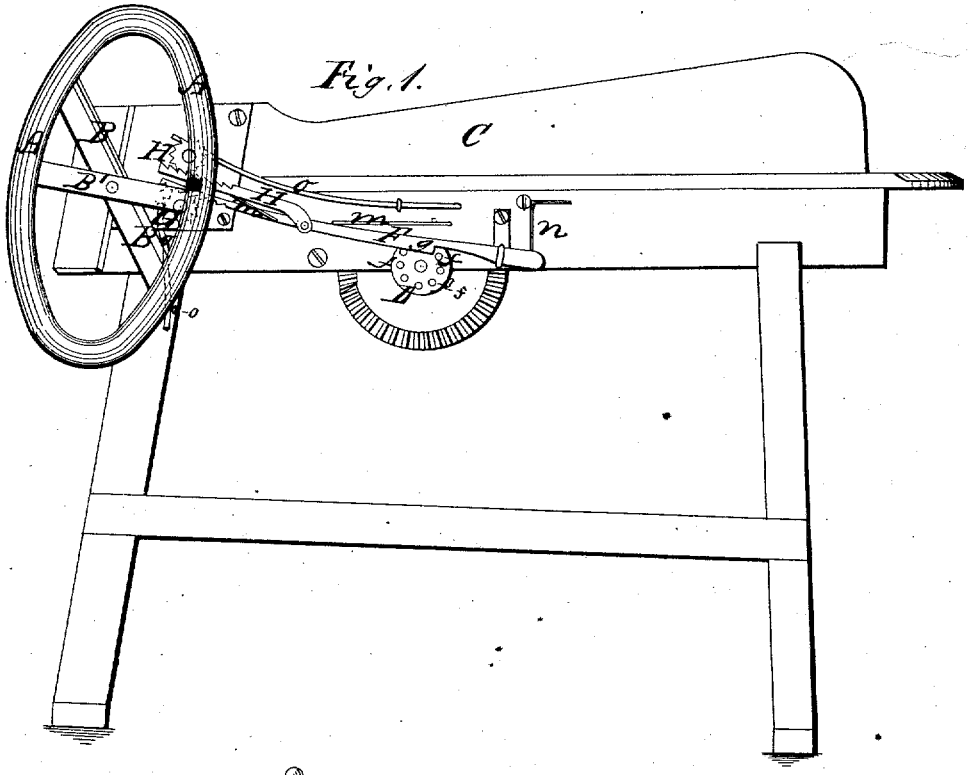
Figure 2:
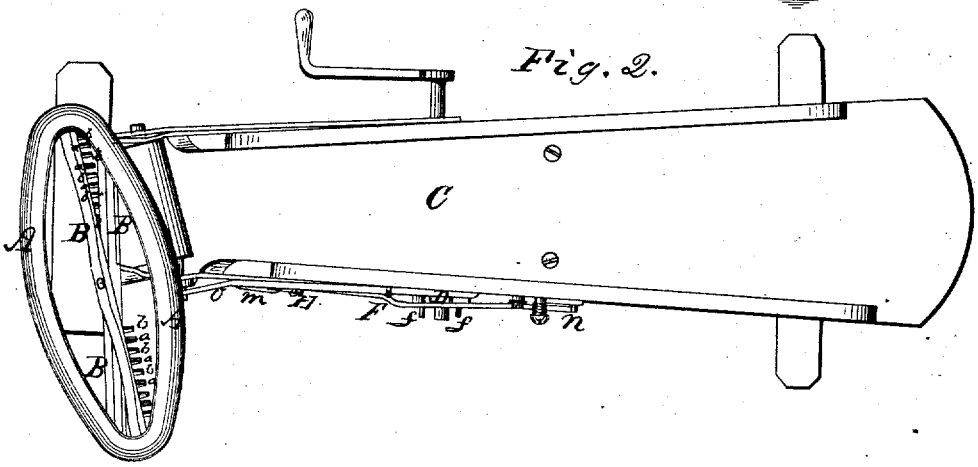
Figure 3:
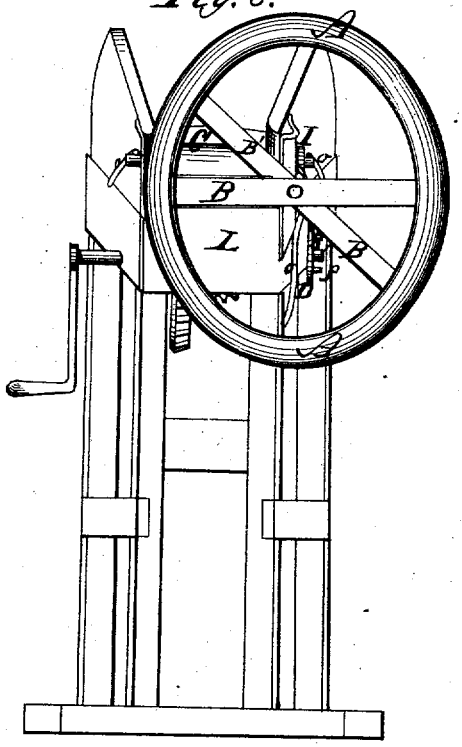
Figure 4:
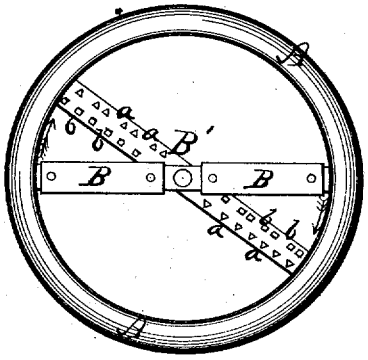
Figure 5:
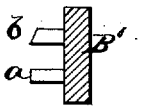
Figure 6:
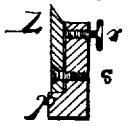

Figure 1 being a side elevation of a straw, hay, and stalk cutter, provided with my improvements; Fig. 2, a top view of the same; Fig. 3, an end view thereof; Figs. 4, 5, and 6, views of parts detached.

Like letters designate corresponding parts in all of the figures.

Two main objects are aimed at in this invention: first, to cut the straw, hay, or stalks with the least power by the most efficient oblique cut; and, second, to comminute or shred and chip fine the ends of the stalks before they are cut off.

I effect these purposes substantially as follows: The revolving cutter-wheel A, on which the moving cutting-knives B B are placed, is situated in a doubly-oblique position in relation to the stalks and the stems of the straw or hay, as they are fed in a longitudinal direction in the feeding box or trough C—that is, oblique to a vertical plane, and oblique to a horizontal line at right angles to the direction of the feeding-box, as clearly shown in Figs. 1 and 2. Thus the knives cut obliquely through the stalks and stems in the direction of their action, and obliquely to the fibers thereof at every point of their action. It is therefore evident that every possible advantage of the oblique cut is secured by this arrangement, one of which is that the stalks and stems are thereby split and partially divided by the knives. The angle of obliquity in either direction may be about as indicated in the drawings, or may vary therefrom if in any case it is found preferable. In addition to the splitting and partially-separating action of the obliquely-cutting severing-knives B B, the fibers of the stalks and stems may be still further separated and shredded in a longitudinal direction by means of short slitting-cutters *a a*, mounted upon the cutter-wheel A, so as to travel a little in advance of the knives B B, and situated in circumferential positions, so as to act in planes coincident with the wheel's revolving motion. I usually employ such comminuting slitters, arranged substantially as represented in Fig. 4. I also employ, in addition to the severing-knives B B, a set of chisel-edged cutters, *b b*, formed as shown in Fig. 5, and arranged so as to cut the stalks and stems transversely. These cutters preceding the knives B B, but not acting upon the stems and stalks till they are fed along, yet still held in place by the feed-rollers, act very efficiently to chop the said stems and stalks fine, and to remove all impurities therefrom without interfering with the action of the severing-knives. These chisel-edged cutters are arranged substantially as shown in Fig. 4, and when slitting-cutters are also used, they may be arranged in alternate positions in separate rows parallel with the said chisel-edged cutters. These cutters are preferably attached to a separate bar or bars, B′, separate from the severing-knives B B and their attaching-bars, so that the cutters may be attached and adjusted separately therefrom.

In order to render the action of the chopping and shredding cutters the most efficient, the straw, hay, or stalks should be fed along quickly and momentarily at intervals, so that they may be at rest while the said cutters are acting upon the same. To effect this mode of feeding I employ a device shown most clearly in Fig. 1. To the driving-shaft *d* is attached a disk or wheel, D, having pins *f f* secured at regular distances apart in a circular line upon its face. These pins successively strike a notch or projection, *g*, of a sliding ratch-bar, F, the teeth *h h* of which match into the teeth of a ratchet-wheel, G, on the shaft of the lower feed-roller, and a branch ratch-bar, H, pivoted thereto, has teeth *i i*, which match into the teeth of another ratchet-wheel, I, on the shaft of the upper feed-roller, there being springs *m m* to keep the two ratch-bars F and H, separated and pressed against their respective ratchet-wheels, but to yield in the backward motion of the ratch-bars. A spring, *n*, retracts suddenly the ratch-bars after each forward movement thereof, which is made quickly, to effect the sudden feed movement required. Stationary spring holders or detents

*o o* prevent the feed-rollers from turning backward. A stationary knife, L, is attached to the end of the feeding-box, to act in connection with the revolving severing-knives B B. This knife rests upon a shoulder, *p*, Fig. 6, of the feeding-box, and it has two sets of set-screws, one set, *r r*, for adjusting the knife accurately to the cutting-knives B B, and the other set, *s s*, for tightening the knife in its adjusted position.

What I claim as my invention, and desire to secure by Letters Patent, is—

1. The severing-knives B B, arranged in a doubly-oblique position, substantially as specified, in combination with the feeding-box C, for the purpose of cutting the stalks and stems in doubly-oblique directions, substantially as herein specified.

2. The chisel-edged comminuting cutters *b b*, attached, substantially as described, to the inner side of the cutter-wheel A, in combination with the severing-knives B B, for the purpose of cutting the stems or stalks transversely previous to their being operated upon by the severing-knives, substantially as herein specified.

3. The pin-disk D, reciprocating ratch-bars F H, ratchet-wheels G I, and retracting-spring *n*, constructed and operating substantially as described, in combination with severing-knives B B and comminuting cutters *b b*, in the manner and for the purpose specified.

Specification signed by me this 13th day of October, 1874.

JOHN K. O'NEIL.

Witnesses:
S. SLANKER,
A. D. BRODIN.